US012796588B2

(12) United States Patent
Hoffmann

(10) Patent No.: US 12,796,588 B2
(45) Date of Patent: Nov. 17, 2026

(54) HYDRAULIC CIRCUIT FOR COLTER PRESSURE AND BLOWER ROTATIONAL SPEED ADJUSTMENT AT AN AGRICULTURAL SPREADING MACHINE

(71) Applicant: Amazonen-Werke H. Dreyer SE & Co. KG, Hasbergen (DE)

(72) Inventor: Karl-Peter Hoffmann, Hude (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 339 days.

(21) Appl. No.: 18/568,554

(22) PCT Filed: May 31, 2022

(86) PCT No.: PCT/EP2022/064666
§ 371 (c)(1),
(2) Date: Dec. 8, 2023

(87) PCT Pub. No.: WO2022/258423
PCT Pub. Date: Dec. 15, 2022

(65) Prior Publication Data

US 2024/0284820 A1 Aug. 29, 2024

(30) Foreign Application Priority Data

Jun. 10, 2021 (DE) ..................... 10 2021 115 001.9

(51) Int. Cl.
*A01C 7/20* (2006.01)
*A01B 49/06* (2006.01)
(Continued)

(52) U.S. Cl.
CPC .............. *A01C 7/205* (2013.01); *A01B 49/06* (2013.01); *A01B 63/008* (2013.01);
(Continued)

(58) Field of Classification Search
CPC ... A01C 7/203; A01C 7/205; A01C 5/06–064; A01B 49/06; A01B 49/065;
(Continued)

(56) References Cited

U.S. PATENT DOCUMENTS

| | | | |
|---|---|---|---|
| 6,460,623 | B1 | 10/2002 | Knussman et al. |
| 2010/0078185 | A1 | 4/2010 | Carlz |

FOREIGN PATENT DOCUMENTS

| | | | |
|---|---|---|---|
| DE | 102007038262 A1 | 2/2009 | |
| EP | 2025215 A1 | 3/2011 | |
| EP | 2717667 B1 | 8/2017 | |

OTHER PUBLICATIONS

Friel et al., "Seed And/or Fertiliser Distributor Machine" (EP 2025215 A1), machine translation (Year: 2009).*

(Continued)

*Primary Examiner* — Tara Mayo
(74) *Attorney, Agent, or Firm* — Potomac Law Group, PLLC; John (Jack) J. Penny, Jr.

(57) ABSTRACT

The invention relates to a hydraulic circuit for colter pressure and blower rotational speed adjustment at an agricultural spreading machine, with a first line region, which is configured to be connected to at least one colter pressure adjustment cylinder and to specify a hydraulic pressure to the colter pressure adjustment cylinder, a second line region which is configured to be connected to a hydraulically drivable blower and to specify a hydraulic pressure to the blower, and a hydraulic valve for adjusting the hydraulic pressure in the first line region and the hydraulic pressure in the second line region.

7 Claims, 2 Drawing Sheets

(51) Int. Cl.
*A01B 63/00* (2006.01)
*A01C 5/06* (2006.01)
*F15B 13/04* (2006.01)

(52) U.S. Cl.
CPC .......... *F15B 13/0401* (2013.01); *A01C 5/064* (2013.01); *F15B 2013/0412* (2013.01)

(58) Field of Classification Search
CPC ..... A01B 63/008; F15B 13/0401–0418; F15B 2013/0412
See application file for complete search history.

(56) References Cited

OTHER PUBLICATIONS

German Search Report for German Patent No. 10 2021 115 001.9 dated Mar. 18, 2022 (includes English language translation).
International Search Report for International Application No. PCT/EP2022/064666 dated Sep. 23, 2022 (includes English language translation).

* cited by examiner

HYDRAULIC CIRCUIT FOR COLTER PRESSURE AND BLOWER ROTATIONAL SPEED ADJUSTMENT AT AN AGRICULTURAL SPREADING MACHINE

CROSS REFERENCE TO RELATED APPLICATIONS

The present application claims priority under 35 U.S.C. § 365 to PCT/EP2022/064666 filed on May 31, 2022 and under 35 U.S.C. § 119 (a) to German Application No. 10 2021 115 001.9 filed on Jun. 10, 2021.

BACKGROUND

The disclosure relates to a hydraulic circuit for colter pressure and blower rotational speed adjustment at an agricultural spreading machine, a hydraulic control block, an agricultural spreading machine, and a method for adjusting the colter pressure and the blower rotational speed at an agricultural spreading machine.

The pressure supply to the colter pressure adjustment cylinders of an agricultural spreading machine has so far been carried out via a line region of a hydraulic circuit which is also connected to a hydraulically drivable blower, where a 2-way flow regulator is arranged upstream of the colter pressure adjustment cylinder. Therefore, only the hydraulic pressure in the common line region, which is specified by the blower, is available for the colter pressure.

At high blower rotational speeds, for example, when sowing barley, wheat, peas, beans, a comparatively high hydraulic pressure is present in the common line region so that the required colter pressure can typically be readily adjusted at high blower rotational speeds. At low rotational speeds at the blower, for example, when sowing rapeseed or grass, only a comparatively low hydraulic pressure is present in the common line region, which in many applications is not sufficient to generate the intended colter pressure by the colter pressure adjustment cylinder. Due to insufficient colter pressure, the intended sowing depths cannot be maintained, which can impair the germination process and plant growth.

SUMMARY

The object underlying the disclosure is therefore to enable colter pressure adjustments at an agricultural spreading machine which are independent of the hydraulic pressure that prevails at the blower.

The object is satisfied by a hydraulic circuit of the type mentioned at the outset, where the hydraulic valve of the hydraulic circuit according to the disclosure is configured as a 3-way flow control valve. Due to the use of the 3-way flow control valve, the required hydraulic pressure always prevails at the colter pressure adjustment cylinder, regardless of the hydraulic pressure that prevails at the blower. Even at low rotational speeds on the blower, at which, for example, a hydraulic pressure of less than 50 bar must prevail at the blower, high hydraulic pressures, for example, 100 bar or more, can prevails at the colter pressure adjustment cylinder. The hydraulic pressure that prevails at the colter pressure adjustment cylinder can therefore be higher than the hydraulic pressure that prevails at the blower. The hydraulic valve, which is configured as a 3-way flow control valve, always ensures that the colter pressure can be adjusted as desired, regardless of the hydraulic pressure that the blower motor requires. At the same time, the rotational speed of the blower can be adjusted by way of the tractor control unit, regardless of the colter pressure.

In a preferred embodiment of the hydraulic circuit according to the disclosure, the first line region is connected to a first valve outlet of the hydraulic valve. The second line region is preferably connected to a second valve outlet of the hydraulic valve. The valve inlet of the hydraulic valve is connected to an inflow line of the hydraulic circuit, where hydraulic fluid from a hydraulic source on the side of the tractor can be introduced via an inlet connection into the inflow line of the hydraulic circuit.

In a further preferred embodiment of the hydraulic circuit according to the disclosure, the first valve outlet of the hydraulic valve connected to the first line region is a priority outlet of the hydraulic valve that limits the volume flow to a volume flow limit value. Alternatively, the second valve outlet of the hydraulic valve connected to the second line region can be a priority outlet of the hydraulic valve that limits the volume flow to a volume flow limit value.

In another preferred embodiment of the hydraulic circuit according to the disclosure, the hydraulic valve is configured to limit the volume flow at the priority outlet to a volume flow limit value in the range of 4-8 l/min, preferably in the range of 5-7 l/min. If the volume flow flowing into the hydraulic valve is above the volume flow limit value, then the excess volume flow above the volume flow limit value is discharged from the hydraulic valve through a secondary outlet of the hydraulic valve. If the volume flow limit value at the priority outlet of the hydraulic valve is, for example, 6 l/min, then the volume flow portion above 6 l/min is not discharged from the hydraulic valve through the priority outlet but through the secondary outlet.

In a further preferred embodiment of the hydraulic circuit according to the disclosure, the second valve outlet of the hydraulic valve connected to the second line region is a secondary outlet of the hydraulic valve, via which the volume flow, that cannot be discharged through the priority outlet due to the volume flow limitation at the priority outlet, can be discharged from the hydraulic valve. Alternatively, the first valve outlet of the hydraulic valve connected to the first line region can be a secondary outlet of the hydraulic valve, via which the volume flow, that cannot be discharged through the priority outlet due to the volume flow limitation at the priority outlet, can be discharged from the hydraulic valve.

In a further development, the hydraulic circuit according to the disclosure comprises a pressure limitation valve which is configured to limit the hydraulic pressure in the first line region to a maximum pressure. If the first line region is connected to a colter pressure adjustment cylinder and specifies a hydraulic pressure to the colter pressure adjustment cylinder, then the hydraulic pressure specified to the colter pressure adjustment cylinder can be adjusted by way of the pressure limitation valve, provided that the pressure is limited by the pressure limitation valve.

The object underlying the disclosure is furthermore satisfied by a hydraulic control block of the type mentioned at the outset, where the hydraulic circuit of the hydraulic control block according to the disclosure is configured according to one of the embodiments described above. With regard to the advantages and modifications of the hydraulic control block according to the disclosure, reference is therefore first made to the advantages and modifications of the hydraulic circuit according to the disclosure.

The housing of the hydraulic control block, into which the hydraulic circuit is integrated, can be configured to be made of, for example, plastic material or metal. For example, the housing is a plastic injection molded housing or an aluminum injection molded housing.

The hydraulic control block preferably comprises a cylinder connection by way of which at least one colter pressure adjustment cylinder can be connected to the first line region. The hydraulic control block preferably comprises a blower connection, by way of which a hydraulically drivable blower can be connected to the second line region. In addition, the hydraulic control block preferably comprises an inlet connection and a return connection. Hydraulic fluid from a hydraulic source on the side of the tractor can be introduced into the hydraulic circuit through the inlet connection. Hydraulic fluid from the hydraulic circuit can be supplied through the return connection to a hydraulic tank on the side of the tractor.

The object underlying the disclosure is furthermore satisfied by an agricultural spreading machine of the type mentioned at the outset, where the hydraulic circuit of the agricultural spreading machine according to the disclosure is configured according to one of the embodiments described above or is part of a previously described hydraulic control block. With regard to the advantages and modifications of the agricultural spreading machine according to the disclosure, reference is first made to the advantages and modifications of the hydraulic circuit according to the disclosure and the advantages and modifications of the hydraulic control block according to the disclosure.

The agricultural spreading machine can be, for example, a sowing machine. The spreading machine can be configured as an attachment. The colter can be a sowing colter of a precision sowing unit. The colter can be arranged together with other colters on a carrier, where the colter pressure adjustment cylinder acts upon the carrier and generates a uniform colter pressure for colters arranged together on the carrier. In particular, the carrier can be rotatable by way of the colter pressure adjustment cylinder, where a colter pressure is established at the colters arranged together on the carrier as a function of the angle of rotation of the carrier. The number of colters arranged together on the carrier is preferably taken into account for controlling the colter pressure adjustment cylinder.

The object underlying the disclosure is furthermore satisfied by a method of the type mentioned at the outset, where the hydraulic valve, by way of which the hydraulic pressure in the first line region and the second line region is adjusted, is configured as a 3-way flow control valve. The method is preferably used to adjust the colter pressure and the blower rotational speed at an agricultural spreading machine according to one of the embodiments described above. In the method according to the disclosure, the colter pressure and the blower rotational speed are preferably adjusted by way of a hydraulic circuit according to one of the embodiments described above. With regard to the advantages and modifications of the method according to the disclosure, reference is therefore made to the advantages and modifications of the spreading machine according to the disclosure and the advantages and modifications of the hydraulic circuit according to the disclosure.

Preferred embodiments of the disclosure shall be explained and described in more detail below with reference to the accompanying drawings.

DETAILED DESCRIPTION

Figure 1:
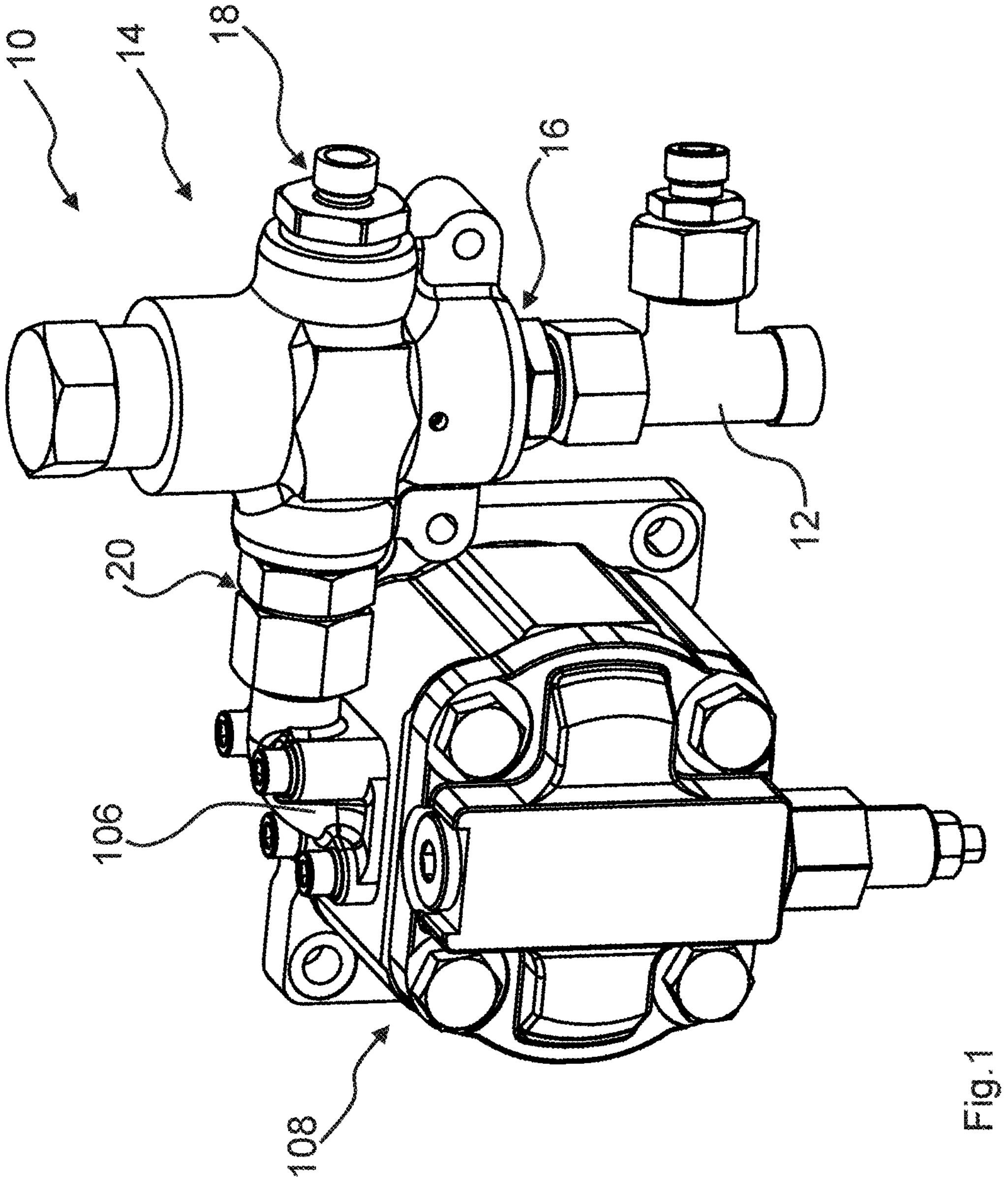
FIG. 1 shows an embodiment of the hydraulic circuit according to the disclosure including the blower in a perspective illustration.

FIG. 1 shows a hydraulic circuit 10 for colter pressure and blower rotational speed adjustment at an agricultural spreading machine Hydraulic circuit 10 comprises an inflow line 12 through which a hydraulic fluid, for example, hydraulic oil, from a hydraulic source 202 (not shown) on the side of the tractor can be introduced into hydraulic circuit 10. Through inflow line 12, the hydraulic fluid reaches a hydraulic valve 14 which is configured as a 3-way flow control valve. Inflow line 12 is connected to valve inlet 16 of hydraulic valve 14. Valve outlet 18 of hydraulic valve 14, which is configured as a priority outlet, is to be connected to at least one colter pressure adjustment cylinder 104 (not shown) so that a hydraulic pressure is specified to colter pressure adjustment cylinder 104 by valve outlet 18. The volume flow is limited at valve outlet 18 to a valve-specific volume flow. The volume flow limit value can be, for example, in the range of 4 to 8 l/min, in particular in the range of 5 to 7 l/min.

Second valve outlet 20 of hydraulic valve 14 is a secondary outlet of hydraulic valve 14 through which the volume flow, that cannot be discharged through the priority outlet due to the volume flow limitation at the priority outlet, can be discharged from hydraulic valve 14. Valve outlet 20 is connected via connecting line 106 to a hydraulic drive 108 of the blower and specifies a hydraulic pressure to drive 108.

Figure 2:
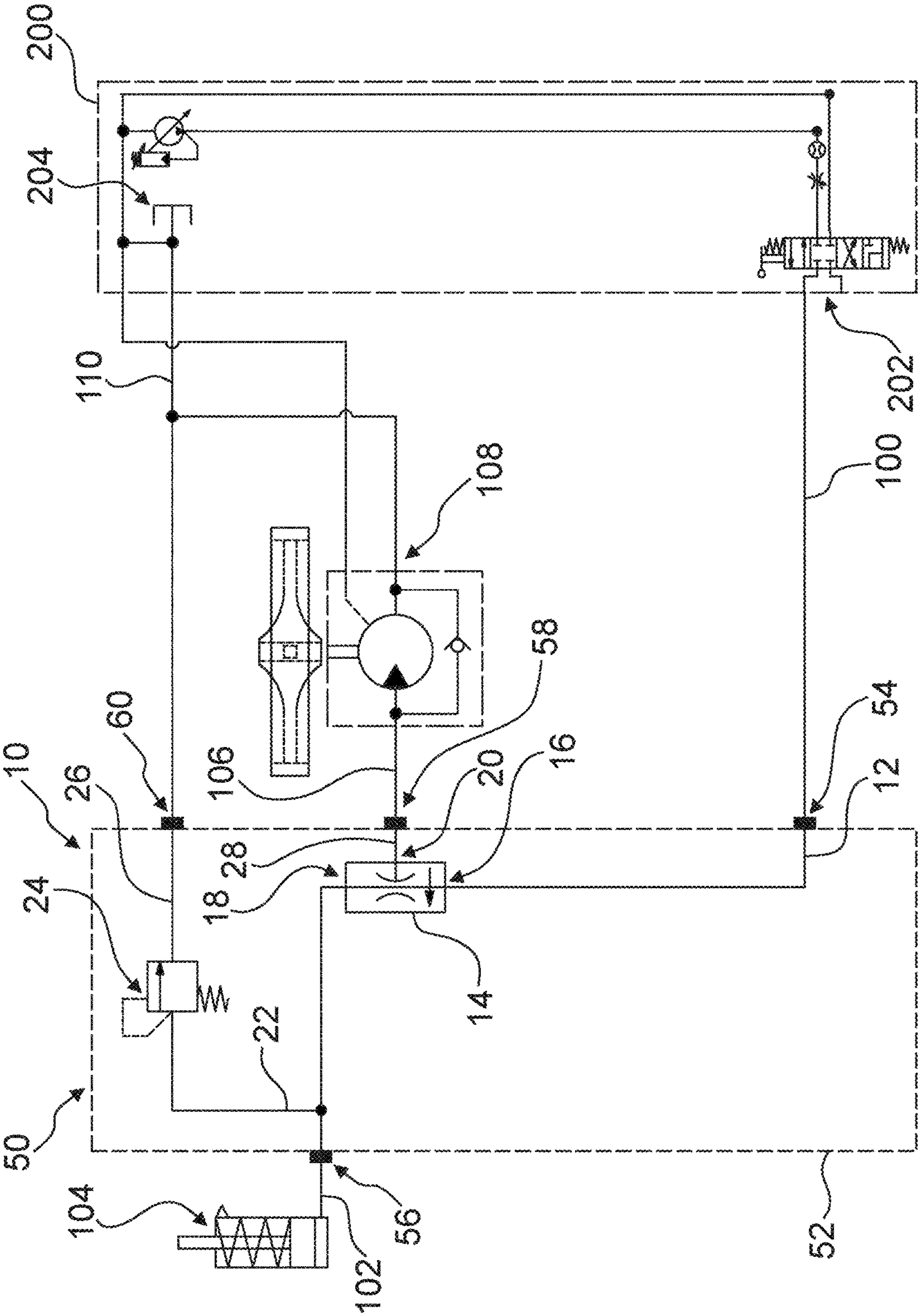
FIG. 2 shows an embodiment of the hydraulic circuit according to the disclosure including the colter pressure adjustment cylinder and the blower in a schematic illustration.

FIG. 2 shows a hydraulic circuit 10 which is integrated into a housing 52 of a hydraulic control block 50. Hydraulic control block 50 comprises an inlet connection 54, via which hydraulic fluid, for example hydraulic oil, from a hydraulic source 202 of a hydraulic unit 200 on the side of the tractor can be introduced into hydraulic circuit 10 For this purpose, an inlet line 100 runs between inlet connection 54 of hydraulic control block 50 and hydraulic unit 200. Via an inflow line 12 connected to inlet connection 54, the hydraulic fluid then reaches a hydraulic valve 14 configured as a 3-way flow control valve. Hydraulic fluid flowing into hydraulic valve 14 via valve inlet 16 can leave hydraulic valve 14 again via valve outlets 18, 20. Valve outlet 18 is configured as a priority outlet so that a volume flow limitation to a volume flow limit value takes place at the priority outlet. It can be, for example, in the range of 5 to 7 l/min. Valve outlet 20 of hydraulic valve 14 is a secondary outlet of hydraulic valve 14 through which the volume flow, that cannot be discharged through the priority outlet due to the volume flow limitation at the priority outlet, is discharged from hydraulic valve 14. From valve outlet 18, the hydraulic fluid reaches a line region 22 which is connected by way of a connecting line 102 to at least one colter pressure adjustment cylinder 104. Line region 22 specifies a hydraulic pressure to colter pressure adjustment cylinder 104. Hydraulic control block 50 comprises a cylinder connection 56 by way of which colter pressure adjustment cylinder 104 is connected to line region 22.

Hydraulic circuit 10 furthermore comprises a pressure limitation valve 24 which limits the hydraulic pressure in line region 22 to a maximum pressure. The hydraulic pressure specified to colter pressure adjustment cylinder 104 can therefore be determined by pressure limitation valve 24. The hydraulic fluid leaving pressure limitation valve 24 is supplied via an outflow line 26 to a return connection 60.

Return connection 50 is connected by way of a return line 110 to a hydraulic tank 204 of hydraulic unit 200 on the side of the tractor so that hydraulic fluid can be returned to hydraulic tank 204 via return line 110.

Valve outlet 20 of hydraulic valve 14 is connected to a further line region 28 of hydraulic circuit 10. Line region 28 is connected to a hydraulic drive 108 of the blower and specifies a hydraulic pressure to drive 108. Hydraulic valve 14 is therefore used to adjust the hydraulic pressure in line region 22 and to adjust the hydraulic pressure in line region 28. Drive 108 of the blower is connected via blower connection 58 and connecting line 106 to valve outlet 20 of hydraulic valve 14 which is configured as a secondary outlet.

By using hydraulic valve 14 configured as a 3-way flow control valve, the required hydraulic pressure always prevails at colter pressure adjustment cylinder 104, regardless of the hydraulic pressure that prevails at drive 108 of the blower. Even at low rotational speeds on the blower, at which, for example, a hydraulic pressure of less than 50 bar must prevail at drive 108 of the blower, high hydraulic pressures, for example, 100 bar or more, can prevail at colter pressure adjustment cylinder 104. The hydraulic pressure that prevails at colter pressure adjustment cylinder 104 can therefore be higher than the hydraulic pressure that prevails at drive 108 of the blower. Hydraulic valve 14 which is configured as a 3-way flow control valve therefore always ensures that the colter pressure can be adjusted as desired.

Colter pressure adjustment cylinder 104 can act, for example, upon a carrier on which several colters, in particular sowing colters, are arranged. The several colters can therefore be acted upon via the common carrier with a uniform colter pressure. The carrier can also be rotatable by way of colter pressure adjustment cylinder 104, where a colter pressure is adjusted at the common colters arranged on the carrier as a function of the angle of rotation of the carrier. The number of colters mounted together on the carrier can be taken into account for controlling pressure limitation valve 24 which specifies the hydraulic pressure to pressure adjustment cylinder 104.

LIST OF REFERENCE CHARACTERS

10 hydraulic circuit
12 inflow line
14 hydraulic valve
16 valve inlet
18 valve outlet
20 valve outlet
22 line region
24 pressure limitation valve
26 outflow line
28 line region
50 hydraulic control block
52 housing
54 inlet connection
56 cylinder connection
58 blower connection
60 return connection
100 inlet line
102 connecting line
104 colter pressure adjustment cylinder
106 connecting line
108 drive
110 return line
200 hydraulic unit
202 hydraulic source
204 hydraulic tank

The invention claimed is:

1. A hydraulic circuit for colter pressure and blower rotational speed adjustment at an agricultural spreading machine comprising:

a first line region configured to be connected to at least one colter pressure adjustment cylinder and to specify a hydraulic pressure to said colter pressure adjustment cylinder;

a second line region configured to be connected to a hydraulically drivable blower and to specify a hydraulic pressure to said blower; and a hydraulic valve for adjusting the hydraulic pressure in said first line region and for adjusting the hydraulic pressure in said second line region;

wherein said hydraulic valve is configured as a 3-way flow control valve, wherein said first line region is connected to a first valve outlet and said second line region is connected to a second valve outlet of said hydraulic valve, and wherein one of said first valve outlet of said hydraulic valve connected to said first line region and said second valve outlet of the hydraulic valve connected to the second line region is a priority outlet of said hydraulic valve that limits the volume flow to a volume flow limit value.

2. The hydraulic circuit according to claim 1, wherein said hydraulic valve is configured to limit the volume flow at said priority outlet to a volume flow limit value in the range of 4 to 8 l/min.

3. The hydraulic circuit according to claim 1, wherein said second valve outlet of said hydraulic valve connected to said second line region is a secondary outlet of said hydraulic valve via which the volume flow, that cannot be discharged through said priority outlet due to the volume flow limitation at said priority outlet, can be discharged from said hydraulic valve.

4. The hydraulic circuit according to claim 1, wherein a pressure limitation valve is configured to limit the hydraulic pressure in said first line region to a maximum pressure.

5. A hydraulic control block comprising:

a housing and a hydraulic circuit integrated into said housing;

wherein said hydraulic circuit is configured according to claim 1.

6. An agricultural spreading machine, comprising:

at least one colter, wherein the colter pressure at said colter is adjustable by way of a colter pressure adjustment cylinder of said spreading machine;

a hydraulically drivable blower, wherein the blower rotational speed is adjustable by way of the hydraulic pressure that prevails at said blower; and a hydraulic circuit which is connected to said colter pressure adjustment cylinder and to said blower and is configured to provide hydraulic pressure to said colter pressure adjustment cylinder and to said blower;

wherein said hydraulic circuit is configured according to claim 1.

7. A method for adjusting the colter pressure and the blower rotational speed at an agricultural spreading machine according to claim 6, comprising:

adjusting the hydraulic pressure in a first line region which is connected to at least one colter pressure adjustment cylinder and specifies a hydraulic pressure to said colter pressure adjustment cylinder and the hydraulic pressure in a second line region which is connected to a hydraulically drivable blower and specifies a hydraulic pressure to said blower by way of a hydraulic valve of said hydraulic circuit;

wherein said hydraulic valve is configured as a 3-way flow control valve.

* * * * *